(12) United States Patent
Ma et al.

(10) Patent No.: US 10,228,088 B2
(45) Date of Patent: Mar. 12, 2019

(54) SUPPORT FRAME AND DISPLAY ASSEMBLY

(71) Applicant: BOE TECHNOLOGY GROUP CO., LTD., Beijing (CN)

(72) Inventors: Yongda Ma, Beijing (CN); Jianbo Xian, Beijing (CN); Yuxin Zhang, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 0 days.

(21) Appl. No.: 15/503,925

(22) PCT Filed: Aug. 3, 2016

(86) PCT No.: PCT/CN2016/093022
§ 371 (c)(1),
(2) Date: Feb. 14, 2017

(87) PCT Pub. No.: WO2017/067273
PCT Pub. Date: Apr. 27, 2017

(65) Prior Publication Data
US 2018/0216778 A1     Aug. 2, 2018

(30) Foreign Application Priority Data
Oct. 19, 2015   (CN) ............. 2015 2 0811624 U

(51) Int. Cl.
*F16M 13/02* (2006.01)
*F16M 11/20* (2006.01)
*F16M 13/00* (2006.01)

(52) U.S. Cl.
CPC ............ *F16M 11/20* (2013.01); *F16M 13/02* (2013.01); *F16M 13/00* (2013.01)

(58) Field of Classification Search
CPC .... F16M 11/20; F16M 2200/08; F16M 13/00; F16M 13/02; Y10T 29/49947;
(Continued)

(56) References Cited

U.S. PATENT DOCUMENTS 2,099,332 A * 11/1937 Di Nuccio ............. A47G 1/162
248/493
3,982,719 A *  9/1976 Kilborne ................. A47G 1/20
248/301
(Continued)

FOREIGN PATENT DOCUMENTS

CN      101672418 A     3/2010
CN      201902800 U     7/2011
(Continued)

*Primary Examiner* — Nkeisha Smith
(74) *Attorney, Agent, or Firm* — Brooks Kushman P.C.

(57) ABSTRACT

A support frame and a display assembly are provided in the present disclosure. The support frame includes a connection frame, a first support plate at a top of the connection frame, and a second support plate and a third support plate respectively at two branches at a bottom of the connection frame. When the display device is on a support plane, the first support plate is connected to a bottom plate of the display device, and the second and the third support plates are connected to the support plane. When the display device is suspended on a suspension wall, the second and the third support plates are connected to a back plate of the display device, and the first support plate is connected to the suspension wall.

15 Claims, 5 Drawing Sheets

(58) Field of Classification Search
CPC .... H05K 5/0204; H05K 5/0217; E04B 9/006; E04B 9/18; F21V 21/02; F16B 45/00; A47F 5/0006; A22C 15/003; A47G 29/083; A47B 97/001; A47B 96/02
USPC .... 248/200, 917, 920, 317, 339, 342, 457.1, 248/476, 477, 489
See application file for complete search history.

(56) References Cited

U.S. PATENT DOCUMENTS

| | | | | |
|---|---|---|---|---|
| 4,190,221 A * | 2/1980 | Updike | ................ | F16M 13/00 248/222.41 |
| 5,248,121 A * | 9/1993 | Harrington | ............ | A47G 1/168 248/477 |
| 6,135,402 A * | 10/2000 | Hatano | ................ | F24F 1/62 248/205.1 |
| 6,418,010 B1 | 7/2002 | Sawyer | | |
| 7,909,295 B2 * | 3/2011 | Powers | ................ | F16M 11/04 248/121 |
| 8,096,517 B1 * | 1/2012 | Hamilton | ............... | B60N 3/005 211/106.01 |
| 8,366,065 B2 * | 2/2013 | Kane, Jr. | ............. | G01C 15/004 248/200 |
| 8,371,543 B2 * | 2/2013 | Schneider | ............ | A47G 1/1606 248/224.8 |
| 8,398,316 B2 * | 3/2013 | Mota | ..................... | G03B 17/00 248/215 |
| 8,844,180 B2 * | 9/2014 | Kludt | ..................... | F16B 2/12 248/223.41 |
| 8,870,135 B2 * | 10/2014 | Grubbs | ................... | F16L 3/24 248/200 |
| 8,967,569 B2 * | 3/2015 | Hsu | ..................... | F16M 11/10 16/233 |
| 9,027,900 B2 * | 5/2015 | Prohofsky | ............ | F16M 11/041 248/449 |
| 9,039,307 B2 * | 5/2015 | Lecuna Aguerrevere | .................. | F16M 11/048 396/420 |
| 9,194,536 B2 * | 11/2015 | Kim | ...................... | F16M 13/00 |
| 9,433,736 B2 * | 9/2016 | Smith | .................... | A61M 11/06 |
| 9,557,002 B2 * | 1/2017 | Wong | .................. | F16M 11/041 |
| 9,601,908 B2 * | 3/2017 | Merritt | ..................... | H02G 3/02 |
| 9,838,578 B2 * | 12/2017 | Huang | ................. | H04N 5/2253 |
| 2004/0232298 A1 * | 11/2004 | Bremmon | ................ | F16M 11/10 248/281.11 |
| 2007/0103605 A1 * | 5/2007 | Maruta | .................. | F16M 11/22 348/797 |
| 2007/0114349 A1 * | 5/2007 | Lawson | ............. | A47G 25/0607 248/304 |
| 2009/0266962 A1 * | 10/2009 | Drane | .................... | H02G 3/263 248/314 |
| 2010/0001165 A1 | 1/2010 | Huang et al. | | |
| 2010/0044536 A1 | 2/2010 | Huang | | |
| 2010/0171011 A1 * | 7/2010 | Wang | .................... | F16M 11/10 248/176.3 |
| 2011/0017895 A1 * | 1/2011 | Yu | ........................ | H05K 7/1489 248/309.1 |
| 2017/0065077 A1 * | 3/2017 | Behroozi | ............. | A47B 23/043 |
| 2017/0211743 A1 * | 7/2017 | Yanyk | ................... | F16M 13/02 |

FOREIGN PATENT DOCUMENTS

| | | |
|---|---|---|
| CN | 103775803 A | 5/2014 |
| CN | 205118605 U | 3/2016 |
| JP | 2008112122 A | 5/2008 |

* cited by examiner

SUPPORT FRAME AND DISPLAY ASSEMBLY

CROSS-REFERENCE TO RELATED APPLICATION APPLICATIONS

This application is the U.S. national phase of PCT Application No. PCT/CN2016/093022 filed on Aug. 3, 2016, which claims priority to Chinese Patent Application No. 201520811624.1 filed on Oct. 19, 2015, the disclosures of which are incorporated in their entirety by reference herein.

TECHNICAL FIELD

The present disclosure relates to the field of display technology, and in particular to a support frame and a display assembly.

BACKGROUND

At present, a display device is commonly fixed at an upright support frame for ease of the viewing. The upright support frame generally includes a pedestal and an upright column. The pedestal is placed on a support plane. A bottom of the upright column is fixed to the pedestal, and a top of the upright column is pivotally connected to the display device. An orientation and an angle of the display device may be adjusted via rotation.

The upright support frame in the related art is of a complicated structure and difficult to be disassembled after being assembled. More importantly, by such upright support frame, the display device may merely stand on the upright support frame, while the upright support frame is useless when the display device is suspended, and then an additional suspension support frame is needed.

From the above, the upright support frame in the related art is of a complicated structure and not applicable for a suspended display device.

SUMMARY

The present disclosure provides a support frame and a display assembly. The support frame is of a simple structure, by which it is convenient to arrange the display device to either stand or be suspended.

To achieve the above object, a support frame is provided, configured to support a display device, including a connection frame, a first support plate at a top of the connection frame, a second support plate and a third support plate respectively arranged at two branches at a bottom of the connection frame. The second and the third support plates are arranged at an identical plane, and the first support plate is parallel to the second and the third support plates. In the case that the display device is arranged on a support plane, the first support plate is connected to a bottom plate of the display device, and the second and the third support plates are connected to the support plane. In the case that the display device is suspended on a suspension wall, the second and the third support plates are connected to a back plate of the display device and the first support plate is connected to the suspension wall.

Optionally, the first support plate is provided with at least one first sliding engagement slot, and first connection members are respectively arranged at a bottom plate of the display device and at a portion of the suspension wall corresponding to the at least one first sliding engagement slot. The first connection members each includes a first screw cap and a first screw provided with screw threads, a sectional area of the first screw cap is larger than a sectional area of the first screw, and a portion of the first screw is threadedly engaged with the bottom plate or the suspension wall. The at least one first sliding engagement slot each includes a first receiving portion matched with a sectional shape of the first screw cap and a first sliding portion matched with a sectional shape of the first screw, the first screw cap extends through the first support plate via the first receiving portion, and the first screw is slid to an end of the at least one first sliding engagement slot along the first sliding portion, to enable the first connection member to engage with the first support plate.

Optionally, the first support plate is provided with three first sliding engagement slots.

Optionally, the second and the third support plates are both provided with at least one second sliding engagement slot, and a second connection member is arranged at a portion of the back plate corresponding to each of the at least one second sliding engagement slot. The second connection member includes a second screw cap and a second screw provided with screw threads, a sectional area of the second screw cap is larger than a sectional area of the second screw, and a portion of the second screw is threadedly engaged with the back plate. The at least one second sliding engagement slot each includes a second receiving portion matched with a sectional shape of the second screw cap and a second sliding portion matched with a sectional shape of the second screw, the second screw cap extends through the second support plate via the second receiving portion, and the second screw is slid to an end of the at least one second sliding engagement slot along the second sliding portion, to enable the second connection member to engage with the second support plate or the third support plate.

Optionally, the second and the third support plates are both provided with two second sliding engagement slots.

A display assembly is further provided, including a display device and the support frame hereinabove.

Optionally, protrusion structures protruded outward are arranged at regions of the back plate corresponding to the second and the third support plates and extended vertically. The second connection member is arranged within a boundary of the corresponding protrusion structure.

Optionally, the back plate is made of metal, the protrusion structures arranged on the back plate are formed by a punching process and have smoothing edges.

Optionally, aligning reinforcement plates are arranged at portions of an inner side of the back plate which are corresponding to the protrusion structures, and threadedly engaged with the inner side of the back plate. Each of the aligning reinforcement plates is provided with a through hole matched with the second screw, and the second screw is engaged with the corresponding aligning reinforcement plate via the through hole.

Optionally, each of the aligning reinforcement plates is rectangular and provided with at least two through holes which are arranged uniformly at a center region of the corresponding aligning reinforcement plate.

Optionally, each of the aligning reinforcement plates is T-shaped and provided with one through hole which is arranged at an intersection region of the corresponding aligning reinforcement plate.

A display assembly is further provided, including a display device and a support frame connected to the display device. The support frame includes a connection frame, a first support plate arranged at a top of the connection frame, and a second support plate and a third support plate at a bottom of the connection frame and forming branches. The second and the third support plates are arranged at an identical plane. A connection between the display device and the support frame is selectively from one connection between a bottom plate of the display device and the first support plate and another connection between a back plate of the display device and the second support plate as well as the third support plate.

Optionally, the first support plate is arranged at a plane parallel to and spaced apart from the plane of the second and the third support plates.

According to the present disclosure, a support frame and a display assembly are provided. The support frame is configured to support a display device, including a connection frame, a first support plate at a top of the connection frame, a second support plate and a third support plate respectively arranged at two branches at a bottom of the connection frame, and the second and the third support plates are arranged at an identical plane. In the case that the display device is arranged on a support plane, the first support plate is connected to the bottom plate of the display device, and the second and the third support plates are connected to the support plane. In the case that the display device is suspended on a suspension wall, the second and the third support plates are connected to a back plate of the display device and the first support plate is connected to the suspension wall. In compared with the support frame in the related art, the support frame in the present disclosure has a less complicated structure and more functions, and it is convenient to arrange the display device to stand or be suspended through the support frame.

DETAILED DESCRIPTION

In order to make the technical solutions of the present disclosure better understood by those skilled in the art, the support frame and the display assembly in the present disclosure will be described hereinafter in details in conjunction with the drawings.

Figure 1:
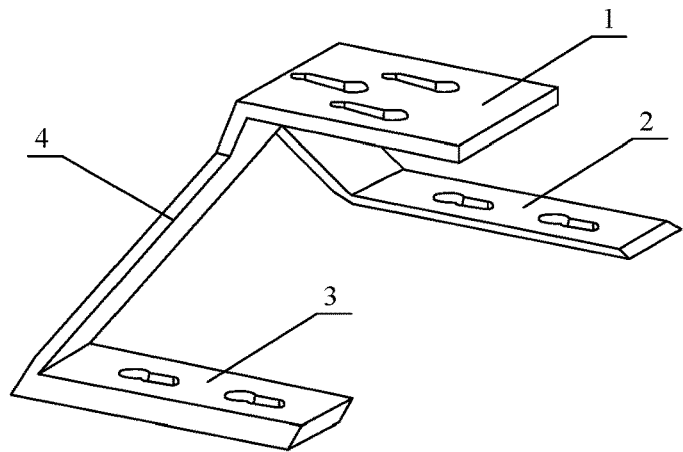
FIG. 1 is a schematic view of a support frame in some embodiments of the present disclosure.

FIG. 1 is a schematic view of a support frame in some embodiments of the present disclosure. As shown in FIG. 1, the support frame is to support a display device and includes a connection frame 4, a first support plate 1 at a top of the connection frame 4, a second support plate 2 and a third support plate 3 respectively arranged at two branches at a bottom of the connection frame 4. The second support plate 2 and the third support plate 3 are arranged at an identical plane. Optionally, the first support plate 1 is parallel to the second support plate 2 and the third support plate 3.

Figure 2:
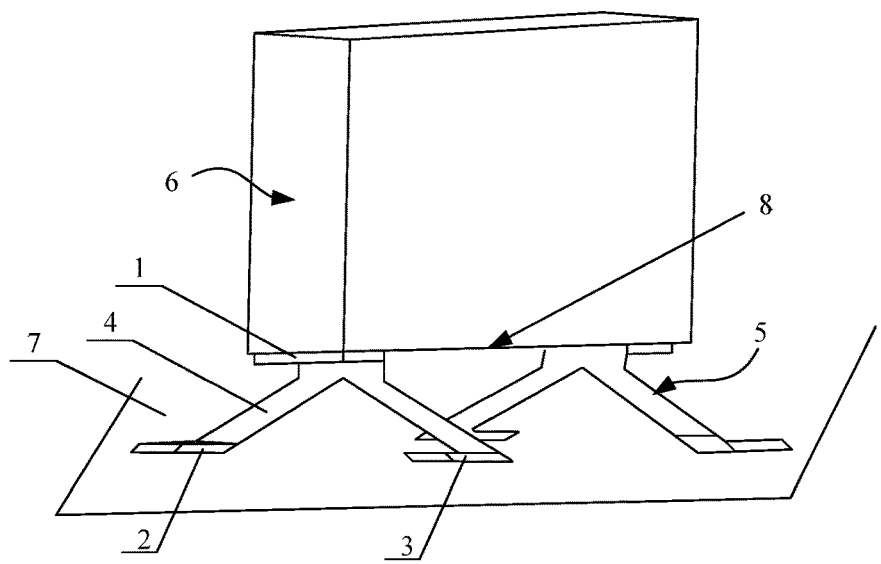
FIG. 2 is a schematic view showing that the support frame shown in FIG. 1 stands on a support plane and supports a display device.

FIG. 2 is a schematic view showing that the support frame shown in FIG. 1 stands on a support plane and supports one display device. As shown in FIG. 2, the first support plate 1 of the support frame 5 is connected to a bottom plate 8 of a display device 6; the second support plate 2 and the third support plate 3 of the support frame 5 are connected to a support plane 7, and then the display device 6 may stand on the support plane 7 through the support frame 5. It should be noted that, the arrangement that the display device 6 with two support frames 5 is merely for illustration. In the embodiment of the present disclosure, the display device 6 may also stand on the support plane 7 through only one support frame 5. Of course, the display device 6 may also stand on the support plane 7 through a plurality of support frames 5, and the detailed description thereof is omitted herein.

Figure 3:
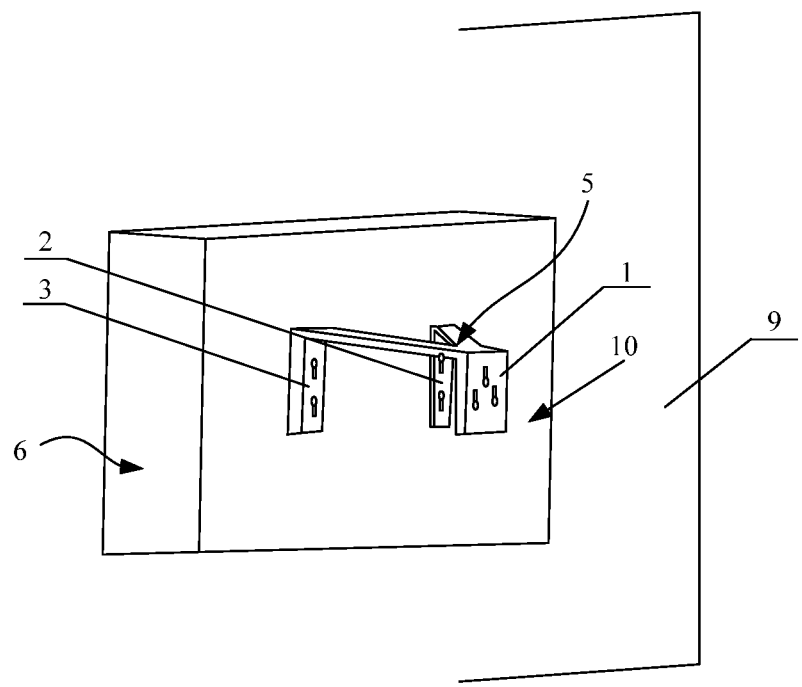
FIG. 3 is a schematic view showing that the support frame shown in FIG. 1 is suspended on a suspension wall and supports a display device.

FIG. 3 is a schematic view showing that the support frame shown in FIG. 1 is suspended on a suspension wall and supports the display device. As shown in FIG. 3, the second support plate 2 and the third support plate 3 of the support frame 5 are connected to a back plate 10 of the display device 6, and the first support plate 1 of the support frame 5 is connected to a suspension wall 9. Then, the display device 6 is suspended on the suspension wall 9 through the support frame 5.

The connection between the support frame 5 and each of the display device 6, the support plane 7 and the suspension wall 9 will be described hereinafter in details in conjunction with the drawings.

Figure 4:
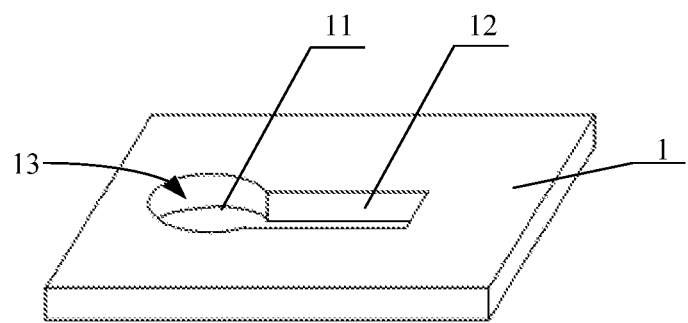
FIG. 4 is a schematic view of a first sliding engagement slot.
Figure 5:
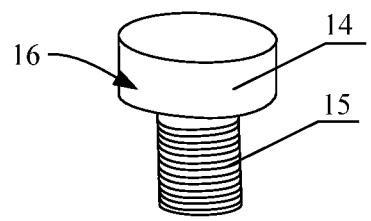
FIG. 5 is a schematic view of a first connection member.

FIG. 4 is a schematic view of a first sliding engagement slot, and FIG. 5 is a schematic view of a first connection member. As shown in FIGS. 4 and 5, the first support plate 1 is provided with at least one first sliding engagement slot 13, and first connection members 16 are respectively arranged at the bottom plate 8 of the display device 6 and at a portion of the suspension wall 9 corresponding to the first sliding engagement slot 13. The first connection member 16 includes a first screw cap 14 and a first screw 15 provided with screw threads. A sectional area of the first screw cap 14 is larger than a sectional area of the first screw 15, and a portion of the first screw 15 is threadedly engaged with the bottom plate 8 and the suspension wall 9. The first sliding engagement slot 13 includes a first receiving portion 11 matched with a sectional shape of the first screw cap 14 and a first sliding portion 12 matched with a sectional shape of the first screw 15. The sliding engagement of the first support plate 1 and the first connection member 16 is described as follows, namely that, the first screw cap 14 extends through the first support plate 1 via the first receiving portion 11, and then the first screw 15 is slid to an end of the first sliding engagement slot 13 along the first sliding portion 12, and at this point, the first connection member 16 is engaged with the first support plate 1 in a sliding manner, so as to fix the first support plate 1 to the bottom plate 8 of the display device 6 or the suspension wall 9.

In an actual assembling process, when the display device 6 is suspended on the suspension wall 9, the first receiving portion 11 is below the first sliding portion 12. At this time, the first support plate 1 moves downward and vertically due to the gravity, so that the first screw 15 may be engaged with the top portion of the first sliding portion 12.

It should be noted that, the first receiving portion 11 is matched with the first screw cap 14, and the first sliding portion 12 is matched with the first screw 15, and the sectional area of the first screw cap 14 is larger than the sectional area of the first screw 15, therefore those skilled in the art should appreciate that, a width of the first receiving portion 11 of the first sliding engagement slot 13 should be larger than a width of the first sliding portion 12 thereof.

Furthermore, the first support plate 1 is provided with three first sliding engagement slots 13 which are arranged in a triangle, so that the connection between the first support plate 1 and the bottom plate 8 of the display device 6 or the suspension wall 9 may be more secure.

It should be noted that, the above solution, namely that the first support plate 1 is fixed to the bottom plate 8 of the display device 6 or the suspension wall 9 through the sliding engagement between first sliding engagement slot 13 and the first connection member 16, is merely an optional embodiment, and the present disclosure is not limited herein. In the present disclosure, the first support plate 1 may further be fixed to the bottom plate 8 of the display device 6 or the suspension wall 9 in other manners. For example, screw holes are arranged in the first support plate 1, and then the first support plate 1 is fixed to the bottom plate 8 of the display device 6 or the suspension wall 9 through bolts. The description of the other manners is omitted herein.

Figure 6:
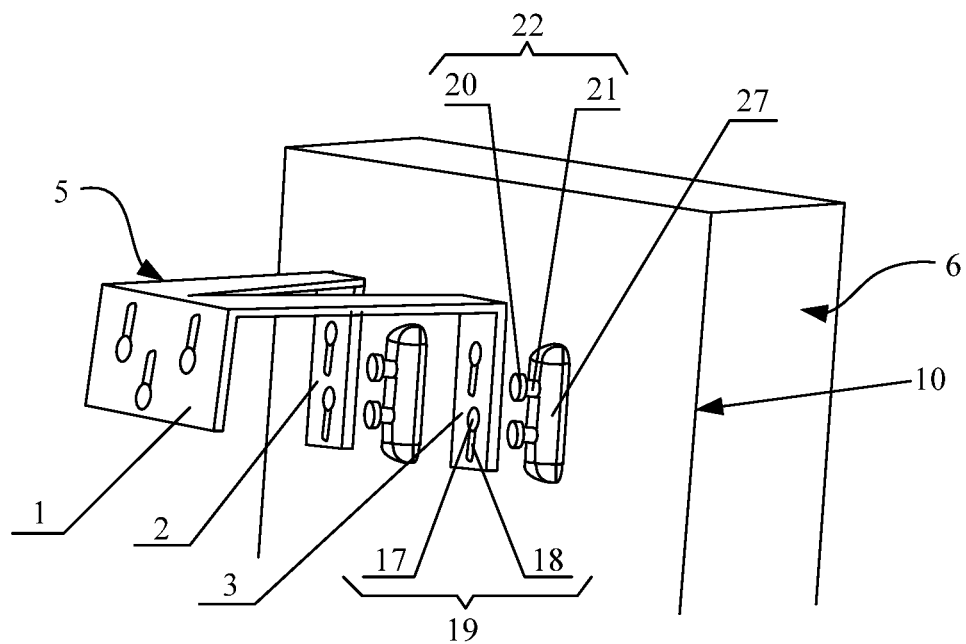
FIG. 6 is a schematic view of an assembly of a second support plate, a third support plate and a back plate.

FIG. 6 is a schematic view of an assembly of a second support plate, a third support plate and a back plate. As shown in FIG. 6, the second support plate 2 and the third support plate 3 are both provided with at least one second sliding engagement slot 19, and a second connection member 22 is arranged at a portion of the back plate 10 corresponding to each of the at least one second sliding engagement slot 19. The second connection member 22 includes a second screw cap 20 and a second screw 21 provided with screw threads. A sectional area of the second screw cap 20 is larger than a sectional area of the second screw 21, and a portion of the second screw 21 is threadedly engaged with the back plate 10. The second sliding engagement slot 19 includes a second receiving portion 17 matched with a sectional shape of the second screw cap 20 and a second sliding portion 18 matched with a sectional shape of the second screw 21. The second screw cap 20 extends through the second support plate 2 via the second receiving portion 17, and the second screw 21 is slid to an end of the second sliding engagement slot 19 along the second sliding portion 18, so as to enable the second connection member 22 to engage with the second support plate 2 or the third support plate 3.

In some embodiments of the present disclosure, the second sliding engagement slot 19 shown in FIG. 6 may be of a structure identical to the first sliding engagement slot 13 shown in FIG. 4, and then the second connection member 22 may be identical to the first connection member 16 shown in FIG. 5.

When the display device 6 is suspended on the suspension wall 9, the second sliding portion 18 is below the second receiving portion 17. At this time, the display device 6 takes the second connection member 22 to move downward and vertically due to the gravity, so that the second screw 21 may be engaged with the bottom portion of the second sliding portion 18.

In addition, when the display device stands on the support plane 7, the second connection member 22 may further be arranged on the support plane 7, so as to fix the second support plate 2 and the third support plate 3 to the support plane 7 in a sliding engagement manner, thereby preventing the display device 6 from moving or inclining. In addition, in some embodiments of the present disclosure, a sucker may be arranged in the second sliding engagement slot 19, so as to adsorb the second support plate 2 and the third support plate 3 onto the support plane 7.

It should be noted that, the more the second sliding engagement slots 19 are arranged in the second support plate 2 and the third support plate 3, the more secure the connection between the back plate 3 and the second support plate 2 as well as the third support plate 3 will be, however, the toughness of the second support plate 2 and the third support plate 3 may be lowered accordingly, i.e., the second support plate 2 and the third support plate 3 may be more prone to be bent. In addition, the second support plate 2 and the third support plate 3 are in contact with the back plate 10 together, so there is no need to arrange too many second sliding engagement slots 19 in the second support plate 2 or the third support plate 3. Optionally, the second support plate 2 and the third support plate 3 are both provided with two second sliding engagement slots 19, thereby to guarantee the secure connection between the second support plate 2 (the third support plate 3) and the back plate 10 and guarantee the toughness of the second support plate 2 and the third support plate 3.

In compared with the support frame in the related art, the support frame in the present disclosure has a less complicated structure and more functions, and it is convenient to arrange the display device to stand or be suspended through the support frame.

Referring to FIG. 6, a display assembly is provided in some embodiments of the present disclosure, including a display device 6 and the support frame 5 hereinabove. Through the support frame 5, the display device 6 may stand or be suspended. In addition, the second support plate 2 and the third support plate 3 of the support frame 5 are both provided with at least one second sliding engagement slot 19, and a second connection member 22 is arranged at a portion of a back plate corresponding to the second sliding engagement slot 19. The detailed description thereof may refer to the embodiments hereinabove, which will be omitted herein.

In some embodiments of the present disclosure, when the back plate 10 is fixed to the second support plate 2 and the third support plate 3 through the second connection members 22, a vertical interaction force may be generated between the second connection members 22 and the back plate 10, and then the back plate 10 may be prone to deform vertically. To solve the above issue, optionally, protrusion structures 27 protruded outward are arranged at regions of the back plate 10 corresponding to the second support plate 2 and the third support plate 3. The protrusion structures 27 are extended vertically, and the second connection member 22 is arranged within a boundary of the corresponding protrusion structure 27. The protrusion structures 27 may serve as reinforcing ribs to increase a bearable maximum force of the back plate 10, so as to avoid the deformation of the portion of the back plate 10 connected to the second support plate 2 and the third support plate 3.

Optionally, the back plate 10 is made of metal, and the protrusion structures 27 arranged on the back plate 10 are formed by a punching process and have smoothing edges.

Optionally, aligning reinforcement plates are arranged at portions of an inner side of the back plate 10 which are corresponding to the protrusion structures 27, and are secured at the inner side of the back plate 10 in a screw joint manner. Each of the aligning reinforcement plates is provided with a through hole matched with the second screw 21. The second screw 21 is engaged with the corresponding aligning reinforcement plate via the through hole. In some embodiments of the present disclosure, the aligning reinforcement plate may effectively share the force applied by the second connection member 22 to the back plate 10, thereby reducing the force applied by the second connection member 22 to the back plate 10. The aligning reinforcement plate is cooperated with the protrusion structure 27, so that it is able to further avoid the deformation of the portion of the back plate 10 connected to the second support plate 2 and the third support plate 3.

Figure 7:
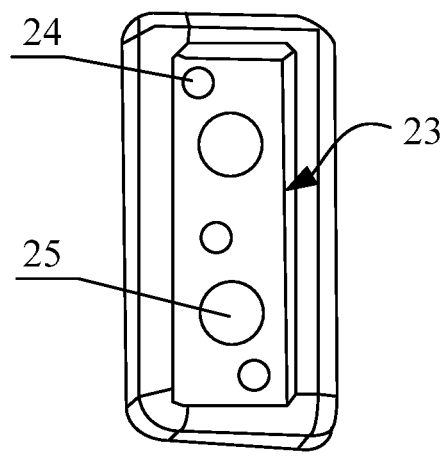
FIG. 7 is a schematic view of an aligning reinforcement plate in the present disclosure.
Figure 8:
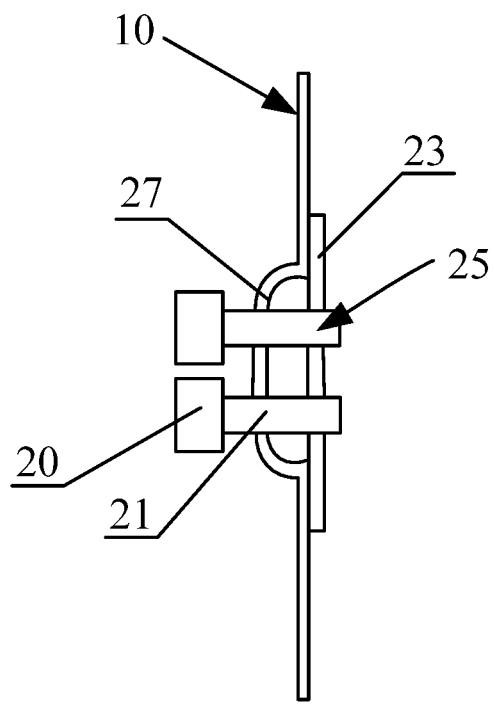
FIG. 8 is a schematic view showing that the aligning reinforcement plate shown in FIG. 7 is fixed to a back plate.

FIG. 7 is a schematic view of an aligning reinforcement plate in the present disclosure, and FIG. 8 is a schematic view showing that the aligning reinforcement plate shown in FIG. 7 is fixed to a back plate. As shown in FIGS. 7 and 8, the aligning reinforcement plate 23 is rectangular and provided with at least two screw holes 24 and at least two through holes 25. The aligning reinforcement plate 23 is fixed to the back plate 10 by bolts extending through the screw holes 24. All the screw holes 24 are arranged uniformly at an edge region the aligning reinforcement plate 23, and all the through holes 25 are arranged uniformly at a center region of the aligning reinforcement plate 23. By the screw holes 24 arranged uniformly at the edge region of the aligning reinforcement plate 23, the connection between the aligning reinforcement plate 23 and the back plate 10 may be more secure. By the through holes 25 arranged uniformly at the center region of the aligning reinforcement plate 23, the force applied to the aligning reinforcement plate 23 may be uniform.

Figure 9:
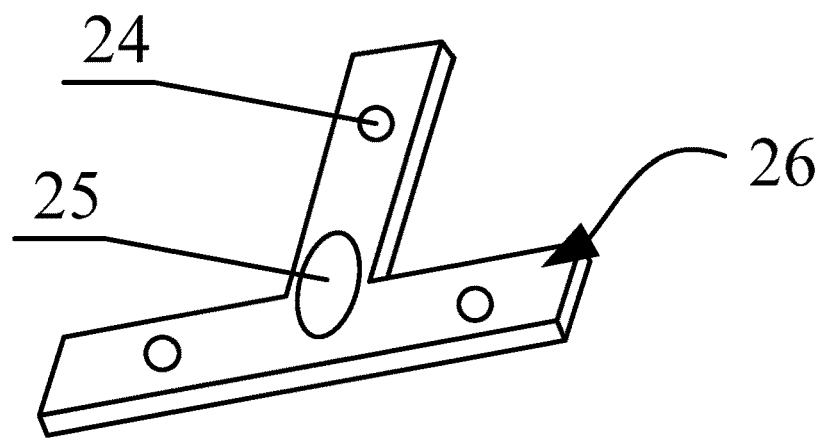
FIG. 9 is a schematic view of an aligning reinforcement plate in the present disclosure.
Figure 10:
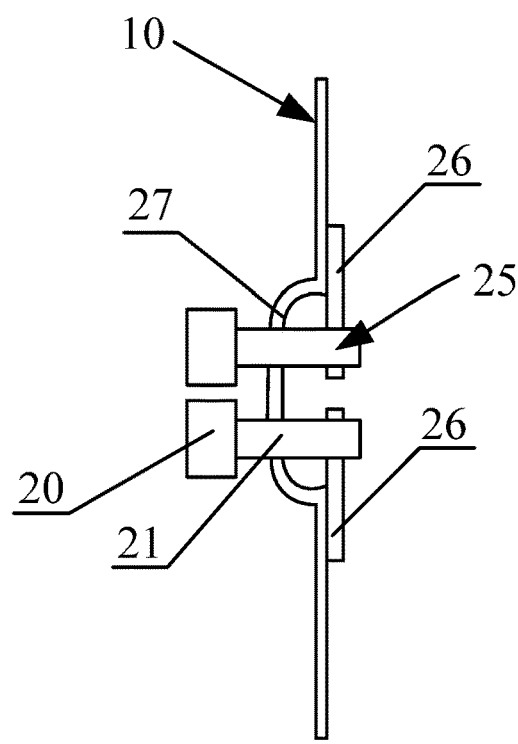
FIG. 10 is a schematic view showing that the aligning reinforcement plate shown in FIG. 9 is fixed to a back plate.

FIG. 9 is a schematic view of an aligning reinforcement plate in the present disclosure, and FIG. 10 is a schematic view showing that the aligning reinforcement plate shown in FIG. 9 is fixed to a back plate. As shown in FIGS. 9 and 10, the aligning reinforcement plate 26 is T-shaped and provided with three screw holes 24 and one through hole 25. The three screw holes 24 are arranged respectively at three ends of the T-shaped aligning reinforcement plate 26, and the through hole 25 is arranged at an intersection region of the T-shaped aligning reinforcement plate 26. The intersection region of the T-shaped aligning reinforcement plate 26 is of highest toughness, so it is able to effectively improve the bearing capacity of the corresponding second connection member 22 by arranging the through hole 25 at the intersection region of the T-shaped aligning reinforcement plate 26.

It should be noted that, the above solution, namely that the second sliding engagement slot 19 is engaged with the second connection member 22 in a sliding manner so as to fix the second support plate 2 or the third support plate 3 to the back plate 10 of the display device 6 or the support plane 7, is merely an optional embodiment, and the present disclosure is not limited herein. In some embodiments of the present disclosure, it is further able to fix the first support plate 1 to the bottom 8 of the display device 6 or the suspension wall 9 in other manners, and the detailed description thereof is omitted herein.

From the above, it is able to fix the first, the second and the third support plates respectively to the corresponding structures in a sliding engagement manner, whether the display device is standing or suspended, therefore it is very convenient to arrange the display device to either stand or be suspended.

It may be appreciated that, the above embodiments are only for illustrating the principle of the present disclosure, but the present disclosure is not limited herein. A person skilled in the art may make further modifications and improvements without departing from the principle of the present disclosure, and these modifications and improvements shall also fall within the scope of the present disclosure.

What is claimed is:

1. A display assembly, comprising: a display device and a support frame;
wherein the support frame includes: a connection frame, a first support plate at a top of the connection frame, a second support plate and a third support plate respectively at two branches at a bottom of the connection frame; wherein the second support plate and the third support plate are at an identical plane;
when the display device is on a support plane, the first support plate is connected to the display device, and the second support plate and the third support plate are connected to the support plane; and
when the display device is suspended on a suspension wall, the second support plate and the third support plate are connected to a back plate of the display device, and the first support plate is connected to the suspension wall;
wherein the second support plate and the third support plate are both provided with at least one second sliding engagement slot, and a second connection member is arranged at a portion of the back plate corresponding to the second sliding engagement slot;
the second connection member comprises a second screw cap and a second screw with screw threads, a sectional area of the second screw cap is larger than a sectional area of the second screw, and a portion of the second screw is threadedly engaged with the back plate; and
the second sliding engagement slot comprises a second receiving portion matched with a sectional shape of the second screw cap and a second sliding portion matched with a sectional shape of the second screw, the second screw cap extends through the second support plate via the second receiving portion, and the second screw is slid to an end of the second sliding engagement slot along the second sliding portion, to enable the second connection member to engage with the second support plate or the third support plate.

2. The display assembly according to claim 1, wherein protrusion structures protruded outward are at regions of the back plate corresponding to the second support plate and the third support plate; the protrusion structures are extended vertically;
the second connection member is within a boundary of a corresponding protrusion structure.

3. The display assembly according to claim 2, wherein the back plate is made of metal, the protrusion structures on the back plate are formed by a punching process and have smoothing edges.

4. The display assembly according to claim 2, wherein aligning reinforcement plates are at portions of an inner side of the back plate which are corresponding to the protrusion structures; the aligning reinforcement plates are threadedly engaged with the inner side of the back plate;
each of the aligning reinforcement plates is provided with a through hole matched with the second screw, and the second screw is engaged with the corresponding aligning reinforcement plate via the through hole.

5. The display assembly according to claim 4, wherein each of the aligning reinforcement plates is rectangular and provided with at least two through holes; all the through holes are arranged uniformly at a center region of a corresponding aligning reinforcement plate.

6. The display assembly according to claim 4, wherein each of the aligning reinforcement plates is T-shaped and provided with one through hole which is arranged at an intersection region of a corresponding aligning reinforcement plate.

7. The display assembly according to claim 1, wherein the second support plate and the third support plate are both provided with two second sliding engagement slots.

8. The display assembly according to claim 1, wherein the first support plate is at a plane parallel to and spaced apart from the plane of the second support plate and the third support plate.

9. The display assembly according to claim 1, wherein the second receiving portion is communicated with the second sliding portion.

10. The display assembly according to claim 9, wherein a width of the second receiving portion is greater than a width of the second sliding portion.

11. A display assembly, comprising: a display device and a support frame;
wherein the support frame includes: a connection frame, a first support plate at a top of the connection frame, a second support plate and a third support plate respectively at two branches at a bottom of the connection frame; wherein the second support plate and the third support plate are at an identical plane;
when the display device is on a support plane, the first support plate is connected to the display device, and the second support plate and the third support plate are connected to the support plane; and
when the display device is suspended on a suspension wall, the second support plate and the third support plate are connected to a back plate of the display device, and the first support plate is connected to the suspension wall;
wherein the first support plate is provided with at least one first sliding engagement slot, and first connection members are respectively at a bottom plate of the display device and at a portion of the suspension wall corresponding to the at least one first sliding engagement slot;
the first connection members each comprises a first screw cap and a first screw with screw threads, a sectional area of the first screw cap is larger than a sectional area of the first screw, and a portion of the first screw is threadedly engaged with the bottom plate or the suspension wall; and
the first sliding engagement slot comprises a first receiving portion matched with a sectional shape of the first screw cap and a first sliding portion matched with a sectional shape of the first screw, the first screw cap extends through the first support plate via the first receiving portion, and the first screw is slid to an end of the first sliding engagement slot along the first sliding portion, to enable the first connection members to engage with the first support plate.

12. The display assembly according to claim 11, wherein the first support plate is provided with three first sliding engagement slots.

13. The display assembly according to claim 11, wherein the first support plate is at a plane parallel to and spaced apart from the plane of the second support plate and the third support plate.

14. The display assembly according to claim 11, wherein the first receiving portion is communicated with the first sliding portion.

15. The display assembly according to claim 14, wherein a width of the first receiving portion of the first sliding engagement slot is greater than a width of the first sliding portion.

* * * * *